Patented Dec. 6, 1949

2,490,712

UNITED STATES PATENT OFFICE

2,490,712

PROCESS FOR THE POLYMERIZATION OF DIOLEFIN HYDROCARBONS

Walter A. Schulze and Willie W. Crouch, Bartlesville, Okla., assignors to Phillips Petroleum Company, a corporation of Delaware No Drawing. Application April 2, 1945,
Serial No. 586,282

6 Claims. (Cl. 260—83.7)

This invention relates to an improved method for carrying out polymerization of polymerizable unsaturated organic compounds. It is applicable to the polymerization and copolymerization of polymerizable unsaturated organic compounds in an aqueous emulsion. In a specific aspect of this invention an aliphatic conjugated diolefin is copolymerized with an organic compound capable of forming a copolymer with the diolefin in an aqueous emulsion system employing an aliphatic alcohol as a polymerization promoting agent. The process of this invention is particularly useful for the production of synthetic rubber by copolymerization of 1,3-butadiene and styrene.

In modern processes for the manufacture of synthetic rubber wherein monomeric raw materials are emulsified in aqueous soap solutions to provide a reaction medium for the production of a synthetic latex, primary consideration must be given to the quality of the resultant polymer, especially with respect to tack, cohesiveness and milling characteristics. On the other hand, secondary considerations relating to the economics of production such as equipment investment and polymer production per unit reactor per day must be reconciled with polymer quality in order to achieve large-scale commercial operation. An important variable having a direct bearing on both polymer quality and economics is polymerization temperature. Low temperatures favor product quality while the resultant decrease in reaction rate is distinctly unfavorable to economics. Conversely, at high temperatures favorable reaction rates are realized, but at the expense of product quality. In the operation of commercial polymerization plants a compromise between product quality and economics must be reached. Thus in the manufacture of polymers of the GR–S type, extensive experience has established that a reaction period of about 15 hours at about 50° C. resulting in a conversion of monomers of 75–80 per cent is necessary in order to produce the highest quality polymers compatible with economically feasible reaction times. It is obvious that with a polymerization period of 15 hours, equipment investment costs are necessarily high. It is also apparent that due to the interdependence of quality and reaction time, a means of increasing polymerization rates at the present or even lower temperature levels would be an advantageous contribution to the art of emulsion polymerization.

It is an object of this invention to provide an improved emulsion polymerization process for the production of polymers of the GR–S type.

Another object of this invention is to provide a method of carrying out the polymerization reaction wherein the polymerization reaction is accelerated with the production of a high quality product.

Still another object of this invention is to provide such a method in which is employed an additive agent capable of promoting the rate of copolymerization of an aliphatic conjugated diolefin in admixture with comonomers in an aqueous emulsion system.

These and other objects and advantages will become apparent from the subsequent disclosure and examples.

We have now found that the rate of reaction in emulsion polymerization systems can be materially increased by addition to the polymerization recipe of catalytic amounts of certain aliphatic alcohols. The alcohols used in carrying out the process of our invention are particularly effective in polymerization systems involving conjugated diolefins in admixture with other polymerizable organic compounds such as the butadiene-styrene system employed in the manufacture of GR–S polymers. Regardless of the particular polymerization system involved, the manner of accomplishing the increased reaction rate is substantially the same. The alcohol is emulsified in water along with the usual ingredients comprising monomeric material, polymerization catalyst and modifiers. The reaction is carried out in the usual manner to give the desired extent of polymerization of the monomer charge. The synthetic latex is subjected to steam distillation to recover the alcohol along with unreacted monomers. The alcohol promoter may be suitably separated from the monomers or it may be recycled to another reactor charge in admixture with said monomers.

The preferred promoting agents of our invention comprise the various isomeric forms of amyl, hexyl and heptyl alcohols. Specific alcohols that may be selected from this group include: pentanol-1, pentanol-2, 2-methyl-butanol-4, 2-methyl-butanol-3, pentanol-3, 2-methyl-butanol-2, 2,2-dimethyl-propanol-1, 3-methyl-pentanol-1, hexanol-1, hexanol-2, hexanol-3, 2,2-dimethyl-butanol-3, 2,2-dimethyl-butanol-4, 2,3-dimethyl-butanol-2, 2-methyl-pentanol-1, 2-methyl-pentanol-2, 2-methyl-pentanol-3, 2-methyl-pentanol-4, 2-methyl-pentanol-5, 2-methyl-pentanol-1, 3-methyl-pentanol-2, 3-methyl-pentanol-3, heptanol-1, heptanol-2, heptanol-3, heptanol-4, 2-methyl-hexanol-1, 2-methyl-hexanol-2, 2-methyl-hexanol-3, 2-methyl-hexanol-4, 2-methyl-hexanol-5, 2-methyl-hexanol-6, 3-methyl-hexanol-3, 3-methyl-hexanol-4.

The alcohols used in the present process are effective as polymerization promoters in concentrations ranging from about 0.5 to 10 parts by weight based on the weight of monomers in the polymerization recipe, although higher quantities may be useful in some instances. Within certain limits the degree of effectiveness of these alcohols as polymerization promoters is determined by the polymerization system, the specific alcohol or mixture of alcohols and the quantity employed. Using about 4 to 5 parts of any of the commonly available aliphatic alcohols having 5, 6 or 7 carbon atoms per molecule in GR–S recipes employing 100 parts of monomeric material, reaction rates may be increased by as much as 50 per cent or more.

The mechanism involved in the promotion of emulsion polymerization systems by aliphatic alcohols used in accordance with our invention is obscure. However, it is known that there is no analogy between the action of the alcohols of this invention and the conventional inorganic activators such as potassium ferricyanide. Thus, whereas ferricyanide activators are effective in small concentrations and over limited concentration ranges of about 0.15 part per 100 parts of monomer, the alcohols used in this process must be present in concentrations of at least 0.5 part and the promoting effect ordinarily increases with increasing proportions up to 10 or more parts per 100 parts of monomer. Since the present promoters are well known solvents, it might be suspected that their action could be attributed to increased solubility of the reactants in the aqueous phase. If this were true, any organic solvent having measurable water and hydrocarbon solubility could be expected to have a promoting effect. We have found, however, that a great many compounds having solubilizing characteristics exhibit no appreciable accelerating effect on polymerization rates. Specific examples of such inoperative solvents include: acetone, ethylene glycol, ethyl alcohol, as well as various esters and amines. It is further known that our highly specific group of promoters do not participate in the polymerization per se to any appreciable extent. Substantially complete recovery of the alcohol promoters is realized at the conclusion of the reaction thus limiting their consumption to mechanical handling losses.

The promoting effect of the aliphatic alcohols on polymerization rates in aqueous emulsion systems is not a characteristic inherent in all aliphatic monohydric alcohols, but appears to be confined to those members having 5, 6 or 7 carbon atoms per molecule. The most pronounced promoting action is observed in the case of the 6 and 7 carbon atoms members. The highly specific nature of our promoters is shown in the following tabulation where the effect of various alcohols on the rate of polymerization of GR–S systems is presented. These data were obtained using standard GR–S recipes comprising butadiene, styrene, modifier, catalyst and soap solution. In each case 4 parts of alcohol per 100 parts of monomeric charge was added to the emulsion and the yield at the end of a specified polymerization period, such as 6 or 8 hours, was compared with unpromoted runs.

| Alcohol | Per Cent Change in Rate |
| --- | --- |
| Ethyl ($C_2$) | −2.2 |
| Isopropyl ($C_3$) | 0.0 |
| Isobutyl ($C_4$) | +0.4 |
| Isoamyl ($C_5$) | +53.5 |
| N-hexyl ($C_6$) | +21.5 |
| Hexanol-2 ($C_6$) | +47.0 |
| 2-ethyl-n-butyl ($C_6$) | +6.5 |
| N-heptyl ($C_7$) | +48.0 |
| Heptanol-4 ($C_7$) | +8.0 |
| N-octyl ($C_8$) | −8.5 |
| N-nonyl ($C_9$) | −4.6 |
| Lauryl ($C_{12}$) | +1.1 |

It is noted that some alcohols appears to inhibit the normal rate of reaction. This is especially true in the case of furfuryl alcohol which gives an 88 per cent reduction in polymerization rate under the above conditions.

The alcohol promoters of this invention are particularly effective as reaction rate accelerators in emulsion polymerization systems employing conjugated diolefins such as butadiene, isoprene, piperylene, and the like, either alone or in admixture with each other or with other polymerizable compounds such as styrene, dichlorostyrene, vinylpyridine, acrylonitrile and the like. The beneficial effect of the promoting agents of our invention is of special practical value when used in butadiene-styrene emulsion systems such as those used in the manufacture of GR–S synthetic rubber.

The following examples are offered as further illustration of the nature of this invention; however, no undue limitations are to be implied except as hereinafter imposed by the claims. The parts are by weight.

*Example I* n-Heptyl alcohol to the extent of 4 parts was added to a typical polymerization recipe of the following composition:

| | Parts |
| --- | --- |
| Butadiene | 75 |
| Styrene | 25 |
| Dodecyl mercaptans | 0.28 |
| Potassium persulfate | 0.30 |
| Soap | 5 |
| Water | 180 |

The ingredients were emulsified and polymerization allowed to proceed for 6 hours at 50° C. with constant agitation. The resulting latex was inhibited with 2.5 parts of phenyl-beta-naphthylamine and then coagulated with aluminum sulfate solution. The yield of dry polymer was 36.6 parts.

Comparable polymerization runs carried out under identical conditions without the added heptyl alcohol resulted in yields of dry polymer equivalent to 24.8 parts. The effect of the n-heptyl alcohol is manifested in a 48 per cent increase in the rate of polymerization.

*Example II*

To the recipe of Example I there was added 4.0 parts of n-heptyl alcohol. Polymerization was initiated at 50° C. and allowed to proceed until the conversion of total monomers amounted to 78 per cent by weight. The polymerization time in this instance was about 11 hours. The control tests carried out in the absence of n-heptyl alcohol and to the same extent of monomer conversion required an average elapsed time of 15 hours. The overall improvement in polymerization rate through the use of n-heptyl alcohol as a promoter amounted to 26.5 per cent in this instance.

*Example III*

To the recipe of Example I there was added 4.0 parts of hexanol-2 after which emulsification was effected and polymerization thereby initiated. At the end of 6 hours of agitation at 50° C. the latex was coagulated and the polymer recovered. The yield of dry polymer under these conditions amounted to 40.8 parts as compared with 27.8 parts in the unpromoted polymerization carried out at the same time. The increase in polymerization rate over a six hour period amounted to 47 per cent as a result of the action of the hexyl alcohol promoter.

*Example IV*

Using the recipe of Example I, polymerization was carried out as in Example III except that 4 parts of isoamyl alcohol was added as the promoter. At the end of 6 hours the promoted batch yielded 37.0 parts of dry polymer while the control run gave only 24.1 parts. The rate increase in this instance is 53.5 per cent.

*Example V*

The recipe of Example I was promoted with 0.8 part of hexanol-2 and polymerization carried out for 6 hours at 50° C. The yield of dry polymer amounted to 29.7 parts as compared with 26.3 parts of polymer obtained from an unpromoted control run. The rate increase in this instance is 13 per cent.

*Example VI*

The recipe of Example I was promoted with 4 parts of n-hexyl alcohol and polymerization carried out for 6 hours at 50° C. The yield of dry polymer recovered was 39.6 parts while an unpromoted control run gave 32.6 parts of polymer. The presence of n-hexyl alcohol increased the rate of polymerization 21.5 per cent.

We claim:

1. In the manufacture of a synthetic rubber-like material by copolymerization of a monomeric material comprising a major portion of butadiene and a minor portion of styrene while dispersed in aqueous emulsion in the presence of a soap emulsifying agent and in the presence of potassium persulfate as a polymerization catalyst under polymerization conditions, the improvement which comprises conducting such polymerization in the presence of an aliphatic monohydric saturated alcohol having at least 5 and not more than 7 carbon atoms per molecule in an amount from 4 to 10 parts by weight per 100 parts of said monomeric material.

2. A method as set forth in claim 1 wherein the aliphatic alcohol is isoamyl alcohol.

3. A method as set forth in claim 1 wherein the aliphatic alcohol is hexanol-2.

4. A method as set forth in claim 1 wherein the aliphatic alcohol is n-heptyl alcohol.

5. In the manufacture of a copolymer of butadiene and styrene in an aqueous emulsion in the presence of a polymerization catalyst and in the presence of a soap as emulsifying agent, the improvement which comprises the addition to the emulsion of from 0.5 to 10 parts of a monohydric saturated aliphatic alcohol of from 5 to 7 carbon atoms per molecule per 100 parts of monomeric material.

6. In the manufacture of a synthetic rubber-like material by copolymerization of a monomeric material comprising a major portion of butadiene and a minor portion of styrene while dispersed in aqueous emulsion in the presence of a soap emulsifying agent and in the presence of potassium persulfate as a polymerization catalyst under polymerization conditions, the improvement which comprises conducting such polymerization in the presence of hexanol-2 in an amount between 4 and 10 parts by weight per 100 parts of said monomeric material.

WALTER A. SCHULZE.
WILLIE W. CROUCH.

REFERENCES CITED

The following references are of record in the file of this patent:

UNITED STATES PATENTS

| Number | Name | Date |
|---|---|---|
| 2,344,213 | Otto | Mar. 14, 1944 |
| 2,380,476 | Stewart | July 31, 1945 |

FOREIGN PATENTS

| Number | Country | Date |
|---|---|---|
| 511,145 | Germany | Oct. 27, 1930 |